United States Patent [19]

Ohmi et al.

[11] Patent Number: 5,211,670
[45] Date of Patent: May 18, 1993

[54] ARMATURES AND METHOD FOR MANUFACTURING SUCH ARMATURES

[75] Inventors: Masanori Ohmi, Anjo; Tsutomu Maekawa, Takahama; Satoru Hamano, Kariya; Masanori Mori; Shogo Uzura, both of Okazaki, all of Japan

[73] Assignee: Nippondenso Co. Ltd., Kariya, Japan

[21] Appl. No.: 944,270

[22] Filed: Sep. 14, 1992

Related U.S. Application Data

[60] Division of Ser. No. 675,104, Mar. 25, 1991, which is a continuation-in-part of Ser. No. 4,259, Jan. 2, 1987, abandoned, which is a continuation of Ser. No. 725,811, Apr. 22, 1985, abandoned.

[30] Foreign Application Priority Data

Apr. 23, 1984 [JP] Japan .................................. 59-82758

[51] Int. Cl.$^5$ ............................................. H02K 15/04
[52] U.S. Cl. ........................................ 29/598; 310/195
[58] Field of Search .......................... 29/596, 598, 736; 310/195, 198, 200-208

[56] References Cited

U.S. PATENT DOCUMENTS

| | | | |
|---|---|---|---|
| 1,834,926 | 12/1931 | Apple | 29/598 |
| 1,843,590 | 2/1932 | Apple | 29/598 |
| 4,417,318 | 11/1983 | Major | 29/598 |

Primary Examiner—Carl E. Hall
Attorney, Agent, or Firm—Cushman, Darby & Cushman

[57] ABSTRACT

An armature for an electric motor has an improved integrated armature coil body. The integrated armature coil body includes an annular and substantially flat portion projecting a minimum distance beyond one end of an armature core, the annular portion being defined by curved connecting portions of separate winding wires arranged and disposed substantially in the Archimedes' spiral relationship about the center of the armature core. Each of the winding wires has first and second straight portions extending from the curved connecting portions through different slots in the armature core and connected to a commutator at the other end of the armature core. Each wire has two curved connecting portions, one overlying the other curved connecting portion of a plurality of other wires.

2 Claims, 7 Drawing Sheets

ARMATURES AND METHOD FOR MANUFACTURING SUCH ARMATURES

This is a division of application Ser. No. 07/675,104 filed Mar. 25, 1991 which is a continuation-in-part of our copending application, Ser. No. 004259, filed Jan. 2, 1987, and abandoned on the filing date hereof, which was a continuation of our prior application Ser. No. 725,811, filed Apr. 22, 1985, now abandoned.

FIELD OF THE INVENTION

The present invention relates to a rotating electrical machine and, more particularly, to an armature and a method for manufacturing the same which is, for instance, used in a motor for starting an internal combustion engine of an automotive vehicle.

DESCRIPTION OF THE PRIOR ART

In one of the conventional armatures, or of the conventional manufacturing methods of the same, first, a straight conductive wire having a predetermined length is eccentrically bent at a nearly center position of the wire so that the bent wire is of a pine-needle shape having a bent portion and a first and a second straight portion, the first and second straight portions extending almost parallel to each other but diverging at a slight angle. Then, the straight portions of a necessary number of such bent wires are inserted into a corresponding number of slots of an apparatus comprising an external rotatable cylindrical jig and a coaxial internal cylindrical jig. The slots are spaced equally around both the inner circumference of the external cylindrical jig and the outer circumference of the internal cylindrical jig. The bent portions of the wires project beyond the flat surfaces of one end of the jigs. In this condition the extent or height of the projection of the bent portions of the inserted wires is regulated by another jig of the apparatus in order to prevent the bent wires from moving in the longitudinal direction, i.e. axially out of the cylindrical jigs. After this, an appropriate relative rotational motion is applied between the external and internal jigs to form an integrated coil body. Then, the integrated coil body is pulled out from the jigs and is inserted into the slots of an armature to assemble a motor. However, a motor using the above described conventional integrated coil body has a deficiency in that by the relative rotational motion, the bent portions are transformed into a chevron shape and protrude to a relatively large extent beyond one end surface of the armature, resulting in a relatively large-size motor, especially in the axial direction.

SUMMARY OF THE INVENTION

It is accordingly an object of this invention to provide an armature for a motor, wherein the armature has end portions of an integrated coil body projecting a minimum extent beyond one end of the armature core opposite to the other end on which a commutator is installed.

Another object of this invention is to provide a compact and powerful armature which has improved air resistance and minimized centrifugal force or moment thereof.

A still further object of this invention is to provide a manufacturing method for an armature having the aforementioned features.

Briefly stated, in order to accomplish the foregoing objects and additional objects other than those described above but derived from this invention, the armature of a motor comprises:

an armature core having a plurality of annularly arranged slots extending throughout its axial length;

a rotatable shaft fixed in the center of the armature core;

a commutator fixedly mounted on the shaft at one end of the armature core; and an integrated coil body including a plurality of winding wires, each of the winding wires having first and second straight portions extending through the slots of the armature core and connected to the commutator at one end of the core and a curved bent portion connecting the straight portions and projecting beyond the other end of the armature core, the bent portions being annularly disposed in the Archimedes' spiral relationship with respect to the other end of the armature core with a portion of each bent portion overlapping or overlying another portion of the bent portion of a plurality of other winding wires and the overlapping portions defining a substantially flat annulus.

In addition, in order to accomplish the aforesaid objects, a manufacturing method comprises the steps of:

(1) eccentrically bending at about midlength a straight conductive wire of predetermined length into a pine-needle shape to form a curved turn-back or curved head portion and a first and a second straight portion, all of the portions being in the same plane, the first and second straight portions extending away from the turn-back portion with a small amount of divergence and the head portion projecting to one side of the second straight portion away from the first straight portion;

(2) inserting the first and second straight portions of a necessary number of the bent wires respectively into a corresponding number of longitudinal slots in the interior of an external rotational cylindrical jig and in the exterior of a coaxial internal cylindrical jig so that the planes of the wires are radially disposed and the turn-back portions project radially inward of the slots in the internal jig;

(3) applying pressure axially of and toward the jigs to the turn-back portion of each bent wire;

(4) relatively rotating the jigs in one direction through a predetermined angle to decrease the extent of the radial inward projection of the turn-back portions, i.e. to decrease the diameter of the circle defined by the radial inner edges of those portions, and so that the planes of the wires incline uniformly angularly from the radial;

(5) engaging the radially innermost edges of the turn-back portions by a circular stop member;

(6) thereafter, relatively rotating the external and internal cylindrical jigs in the opposite direction through a predetermined angle in order to make an integrated coil body, whereby each of the turn-back portions of the bent wires is transformed into a first curved longer connecting portion and a second curved shorter connecting portion both connected to a twisted connecting portion having a longitudinal component of direction as respects the straight portions, whereby the first connecting portions overlie the second connecting portions of a plurality of different conductive wires and the first and second connecting portions are disposed respectively substantially in the Archimedes' spiral relationship; and (7) then, removing said integrated coil body from said external and internal jigs, inserting the first and second straight portions of the wires respectively into one end of different ones of a plurality of annularly disposed slots extending throughout the axial length of an armature core, and connecting the first and second straight portions extending out of the other end of the slots to a commutator.

DETAILED DESCRIPTION OF PREFERRED EMBODIMENTS

An embodiment of this invention will now be described hereinafter in detail with reference to the accompanying drawings.

Figure 1:
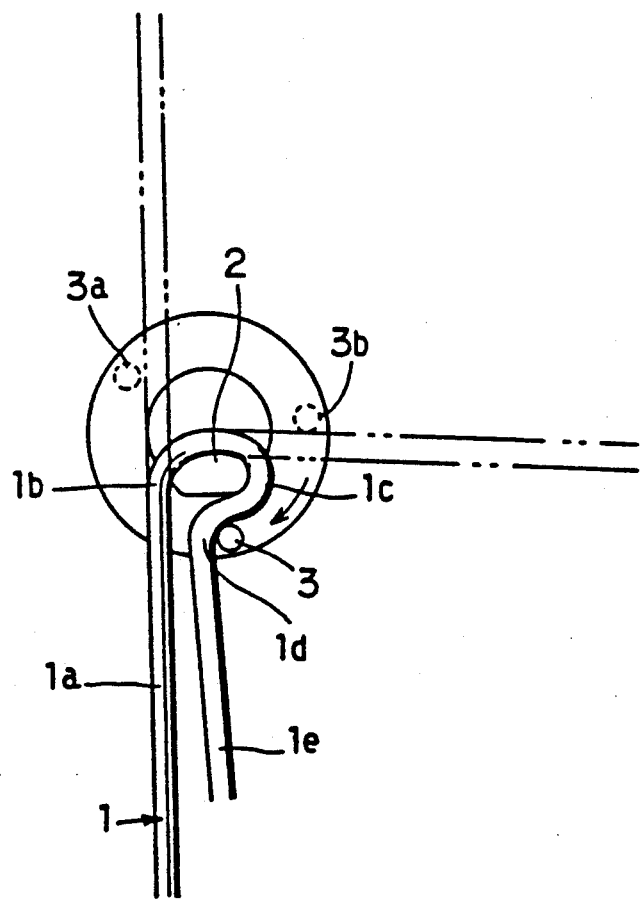
FIG. 1 is a front view showing details of a jig to form a coil wire of pine-needle shape according to the invention.

As shown in FIG. 1, a single straight conductive wire 1 at one end fixed to a jig (not shown), is bent at almost its midlength against a peripheral portion of a bend rod 2 by rotating a pin 3 in the direction of the arrow (from position 3a to position 3). The rotational center of the pin 3 does not correspond to the center of the bend rod 2. Bending the conductive wire in the above described method forms a conductive wire of pine-needle shape having a first straight portion 1a, a first bent portion 1b bent at a right angle to the first straight portion 1a, a portion 1c of "U" shape extending from the bent portion 1b, another bent portion 1d connected to the other end of the "U" shape portion 1c and being bent at a right angle to the axial direction of the straight portion 1a, and a second straight portion 1e extending from the bent portion 1d. As shown in FIG. 1, the first and second straight portions 1d and 1e are almost parallel but diverge slightly in the same plane from the bent portions 1b, 1c and 1d. These latter portions define a curved head portion in the same plane as the straight portions and which projects to one side of the straight portion 1e away from the other straight portion 1a.

Figure 2:
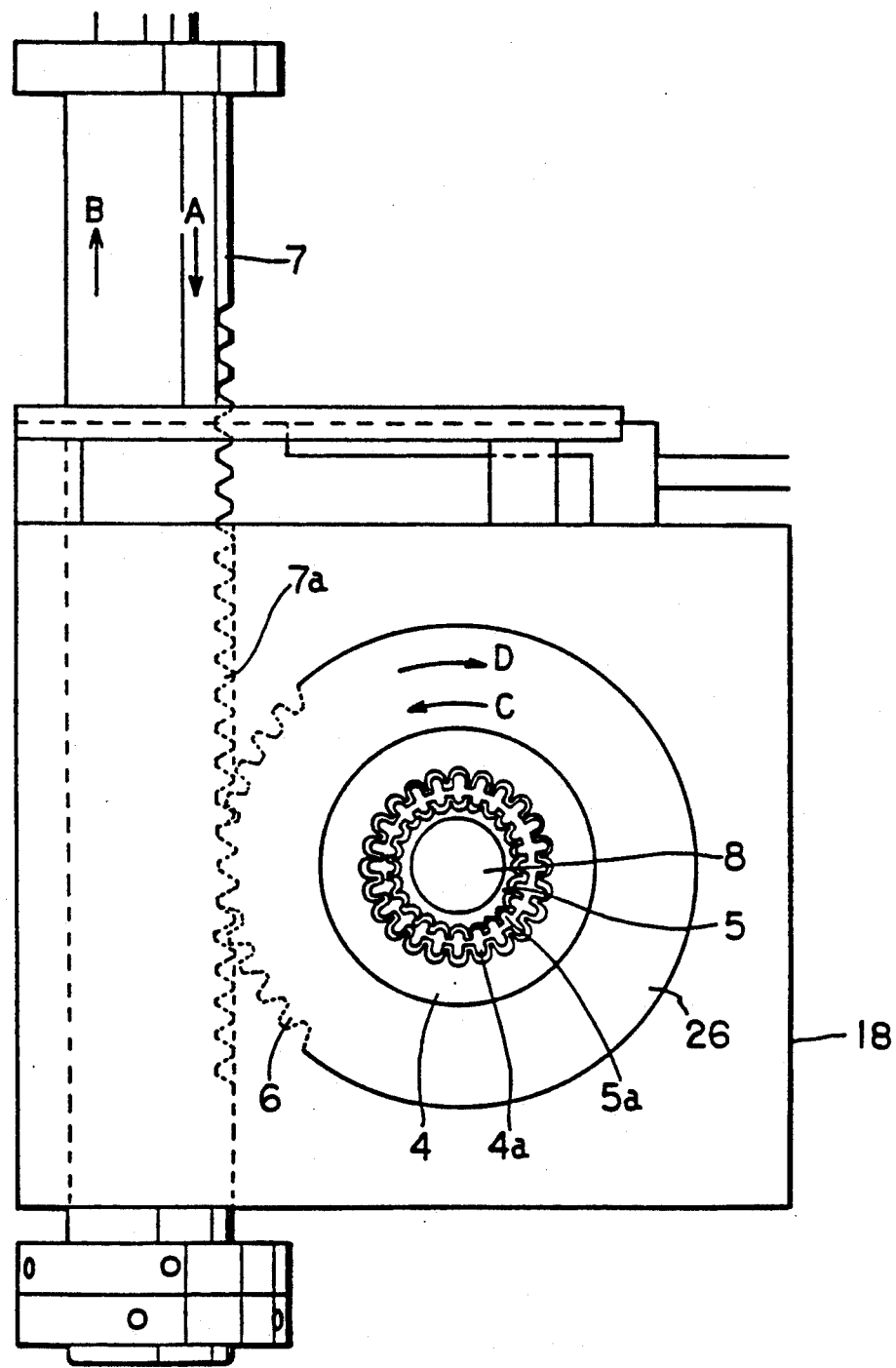
FIG. 2 is a top view of a portion of an apparatus which forms an integrated armature coil body according to the invention.
Figure 3:
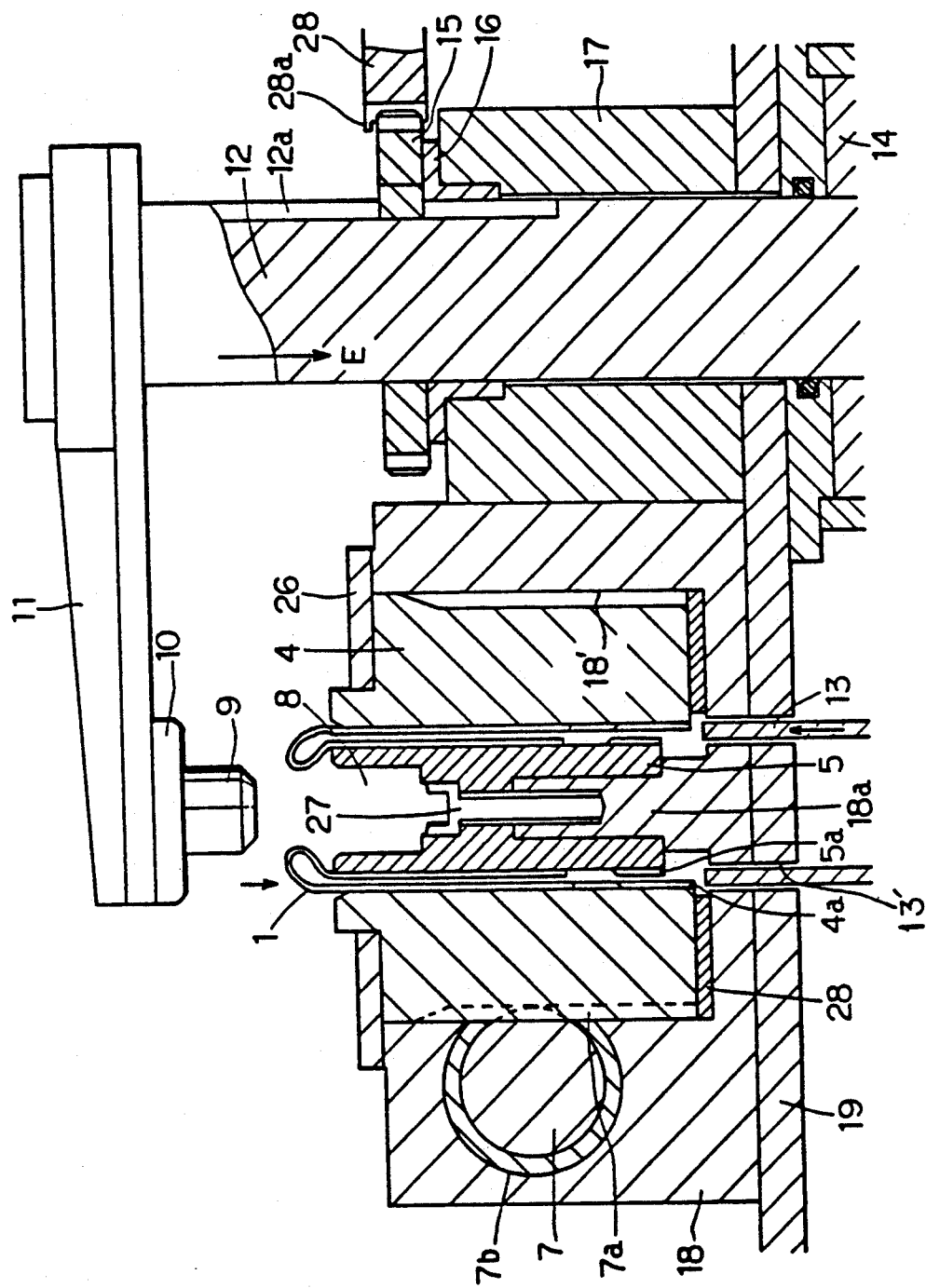
FIG. 3 is a view, mostly in vertical-section, of the apparatus shown in FIG. 2.

An apparatus for forming an integrated armature coil body, as shown in FIGS. 2 and 3, comprises a housing 18 having a circular socket 18' extending from the upper side thereof. At the center of the bottom of the socket 18' is an upwardly extending projection 18a. The forming apparatus also comprises another housing 17, one side, the left side in the embodiment, of which engages the housing 18. Both housings 17 and 18 are secured to a base 19 by adequate means (not shown). In the socket 18' of the housing 18 there is rotatably disposed, on a bearing washer 28, an outer cylindrical jig 4 having a plurality of semi-circular longitudinal slots, twenty-three slots in the embodiment shown in FIG. 4(a), spaced equally around its inner circumference, each for receiving the first straight portion 1a of a bent wire 1. The jig 4 is prevented from moving upward by an annular holding plate 26 secured to the housing 18 by means of bolts and nuts or the like (not shown).

Figure 4A:
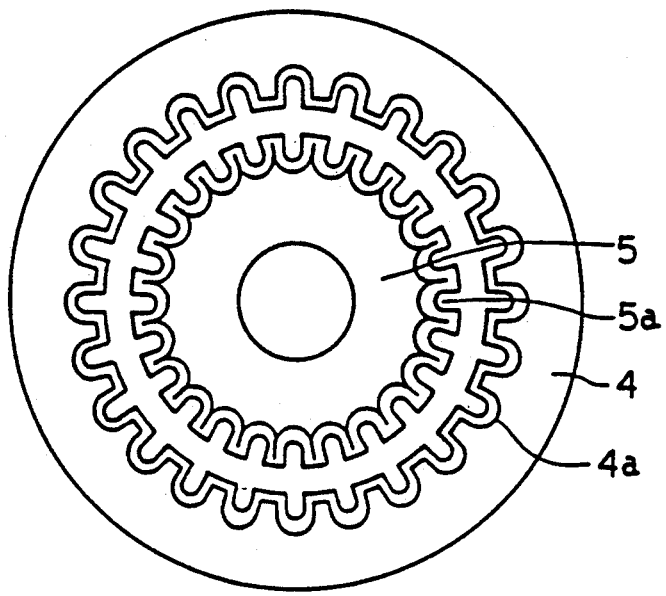
FIGS. 4(a), 4(b) 4(c) and 4(d) are fragmentary top views illustrating stages in the formation of the integrated armature coil body.

A fixed cylindrical inner jig 5, having an outer diameter slightly less than the inner diameter of the jig 4, is positioned coaxially within the jig 4 and has a corresponding number of semi-circular longitudinal slots 5a spaced equally around its outer circumference in opposition to or aligned with the slots 4a in the outer jig 4 as shown in FIG. 4(a). The jig 5 has an axial socket 8 in its upper end and another socket in its lower end which fits over the projection 18a and is secured thereon by a screw 27, or the like.

The jig 4 has longitudinal gear teeth 6 (FIG. 2) on its outer periphery, which mesh with gear teeth 7a on a rack 7 supported in a bearing 7b in the housing 18 and reciprocable as shown by arrows A and B (FIG. 2). FIG. 2 shows that movement of the rack 7 in direction A rotates the jig 4 in a counterclockwise direction (arrow C) and reverse movement (arrow B) rotates jig 4 in a clockwise direction (arrow D). As shown in FIG. 3, extending through the base 19 and the bottom of the socket 18' in the housing 18 is a circular array of holes 13', twenty-three holes in the embodiment illustrated, aligned with the holes defined by the opposed slots 4a and slots 5a in the jigs 4 and 5 as shown in FIG. 4(a). An ejection member having pins 13 extending upward through the holes 13' can be moved axially of the jigs 4 and 5, up and down in FIG. 3, by an appropriate motor (not shown).

The upright rod 12 of a cylinder 14 is reciprocably mounted in the housing 17 (FIG. 3). The rod 12 has a spline 12a to which a gear 15 is connected for rotating the rod 12. A "L"-shaped bearing member 16 has the lip thereof interposed between the gear 15 and the top of the housing 17 so that the gear 15 will rotate easily. The gear 15 is prevented from moving upward in its axial direction by a flange portion 28a of a driving gear 28 which meshes with the gear 15. To the upper end of the rod 12 is secured a supporting arm 11 carrying a wire-engaging jig 10 having a downward projecting circular stop member 9 alignable with the socket 8 in the inner jig 5.

Figure 4B:
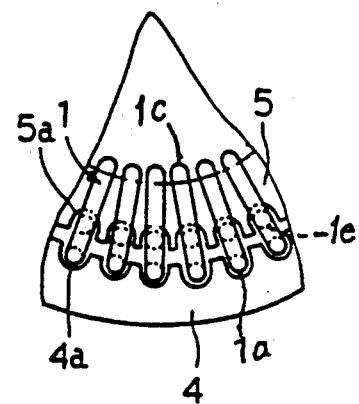

In operation, in order to insert the straight portions of the pine-needle shaped conductive wires 1 into the holes defined by the slots 4a and 5a, the supporting arm 11 is rotated by the gears 15 and 28 to move the jig 10 and stop member 9 out of alignment with the bore 8 of the inner jig 5. As shown in FIG. 4(b), while the slots 4a and 5a are radially aligned, the first straight portions 1a of the pine-needle shaped bent conductive wires shown in FIG. 1 are inserted into the slots 4a of the jig 4 and the second straight portions 1e of same are inserted into the slots 5a of the jig 5 by a wire inserting device (not shown). Thus, the curved bent portion or head of each wire is radially disposed and projects radially inward of the slots 5a. After the insertion of the bent wires, the supporting arm 11 is rotated back to the position shown in FIG. 3.

Figure 4C:
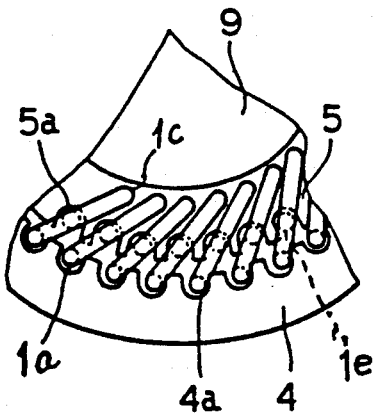

Thereafter, the jig 4 is rotated clockwise by the rack 7 (direction D as viewed in FIG. 2) by an angular amount of about half the distance between the neighboring slots 5a in the jig 5. This rotation of the jig 4 inclines all of the wires to the radial and increases the diameter of the circle defined by the inner edges of the heads of the bent wires s that the circle diameter becomes slightly greater than the diameter of the socket 8 in the jig 5. The cylinder 14 is then operated to move the rod 12 downward (direction E), to insert the circular stop into the socket 8. At this time, the inner edges of the heads, i.e. the innermost edges of the curved portions 1c of the bent wires, are adjacent to or almost in contact with the curved surface of the stop 9 as shown in FIG. 4(c). In this condition, pressure of 550 to 600 kg is constantly applied to the tops of the heads of the bent wires by the wire-engaging jig 10 through the cylinder 14, the rod 12 and the supporting arm 11. At the same time the innermost edges of the curved portion 1c of the bent wires 1 abut against and are maintained against radial inward movement by the stop 9.

Figure 4D:
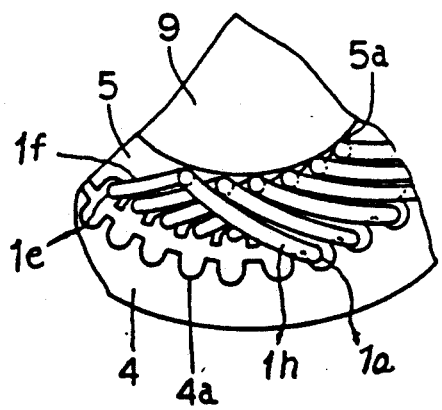
Figure 5A:
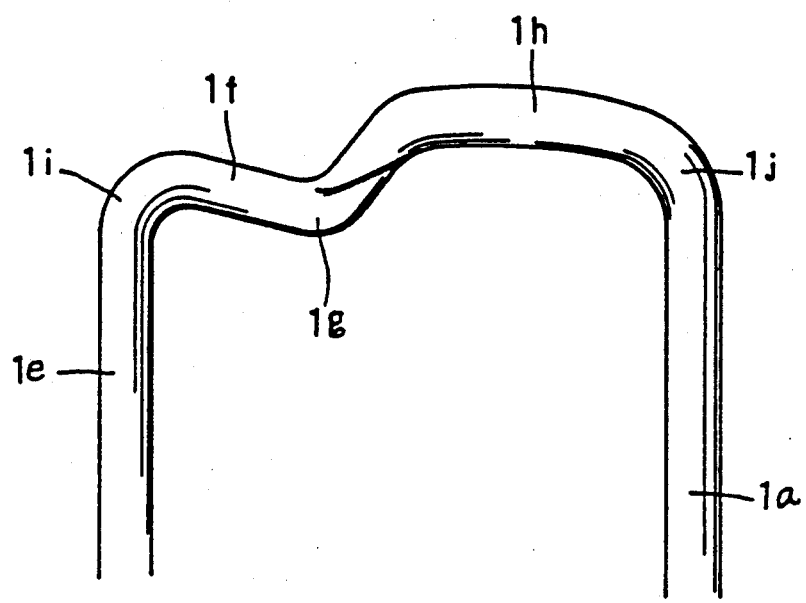
FIG. 5(a) is a side view showing details of the coil wire.
Figure 5B:
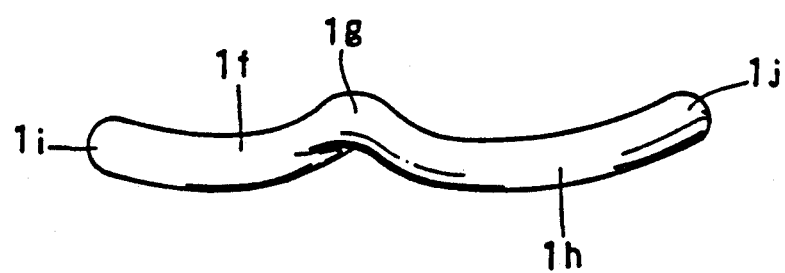
FIG. 5(b) plan view of the wire shown in FIG. 5(a)

Under this condition the jig 4 is rotated by the rack 7 in the counter-clockwise direction (direction C), as viewed in FIG. 2 by an angular amount of about six to eight times the distance between neighboring slots (FIG. 4(d). As described above, since the innermost edges of the curved portions 1c of the bent wires 1 engage against the curved surface of stop 9, the contact areas between them function as fulcrums so that such counter-clockwise movement of the jig 4 twists the wires and the bent portions or heads are no longer coplanar with the straight portions 1a and 1e. At the same time, the downward pressure of the jig 10 somewhat flattens the head portions. The final result, best shown in FIGS. 5(a) and 5(b), is a twisted portion 1g having a longitudinal component of direction as respects the straight portions 1a and 1e. Connecting the upper end of the twisted portion 1g with the upper end of the first straight portion 1a is a curved connecting portion 1h and connecting the lower end of the twisted portion with the upper end of the second straight portion 1e is a curved connecting portion 1f somewhat shorter than the connecting portion 1h, all as shown in FIGS. 5a and 5b.

The further result is that the connecting portions 1h and 1f are offset, longitudinally of the straight portions 1a and 1e, a distance about equal to the thickness of the wire 1 and each connecting portion 1h overlies the connecting portion 1h of a series of different wires, as shown in FIG. 4(d).

Finally, the jig 4 is rotated in the clockwise direction (direction D as viewed in FIG. 2) by an amount of about 0.3 times the angular distance between the neighboring slots. This is provided for precluding possible spring back of the twisted wires and for assuring substantially radial alignment of each straight portion 1a of each wire with a straight portion 1e of a different wire. As a result, the portions 1f and 1h of the several wires are formed respectively in the Archimedes' spiral relationship.

Figure 6:
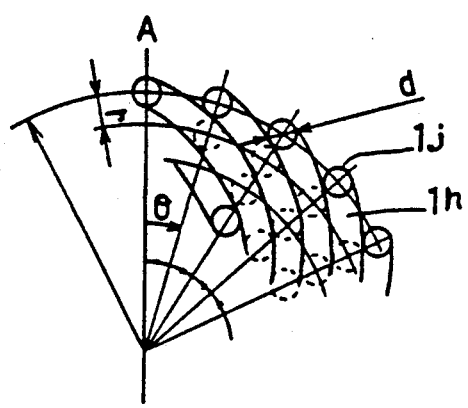
FIG. 6 is a plan view similar to that of FIG. 4(d) and illustrates the Archimedes' spiral arrangement of the coil wires.
Figure 7:
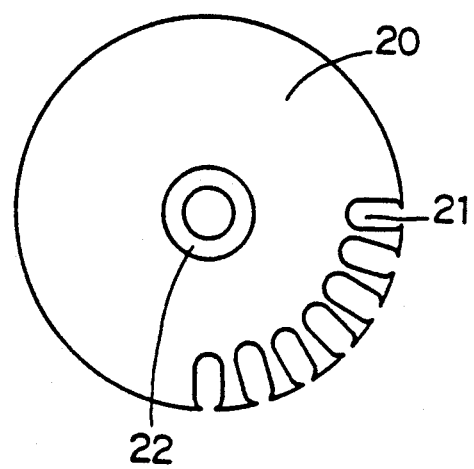
FIG. 7 is an end view of an armature core showing some of the slots therein.

As shown by FIGS. 6 and 7, the Archimedes' spiral is determined as follows:

$$r = \frac{n \cdot d}{2\pi} \times \frac{\theta \cdot \pi}{180} = \frac{n \cdot d \cdot \theta}{360}$$

wherein, n is number of the slots 21 in the armature 20 (FIG. 7) and d is the diameter of the conductive wire 1. In the illustrated embodiment, n is 23 (twenty-three slots) so that if $\theta$ is three hundred and sixty over twenty-three (360/23), r is then calculated as follows:

$$r = \frac{23 \times d}{360} \times \frac{360}{23} = d$$

The calculated result means that the shorter connecting portion 1f becomes closer to the center of an armature core 20, by the amount of the diameter of the conductive wire 1, for every three hundred and sixty over twenty-three rotational degrees.

Thereafter, the supporting arm 11 is moved up by the cylinder 14 and rotated, by the gear train 15, 28 to move away from the thus-formed integrated coil body. The ejection member is then moved upward so that the pins 13 engage the free ends of the straight portions 1a and 1e and push the integrated armature coil body up out of the apparatus.

Figure 8:
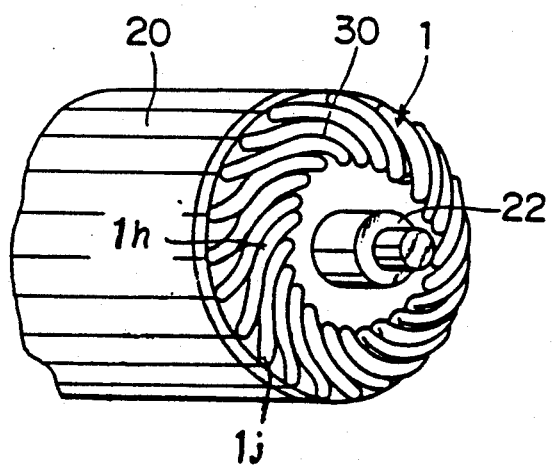
FIG. 8 is a fragmentary perspective view showing details of an armature according to this invention.
Figure 9:
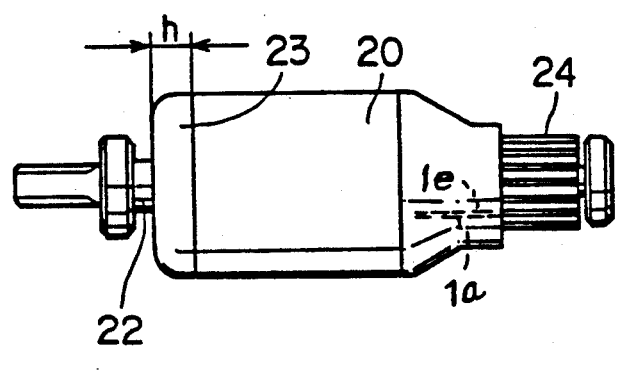
FIG. 9 is a side view of an armature according to this invention.
Figure 10:
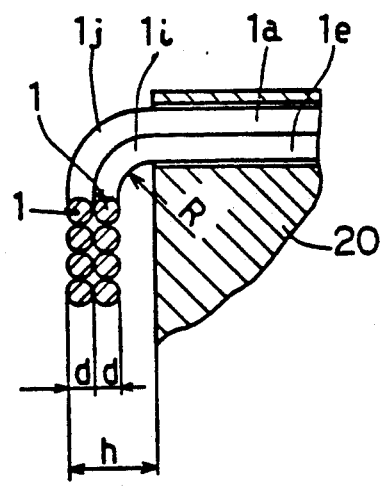
FIG. 10 is an enlarged fragmentary sectional view of the coil wires and the armature.

As shown in FIGS. 8-10, the first straight portions 1a and the second straight portions 1e of the integrated armature coil body are inserted respectively into one end of different slots 21 in the armature core 20. Each slot 21 in the armature core 20 is supplied with an insulating paper or insulation member (not shown) at assembly. The armature core 20 has an armature shaft 22 on one end of which a commutator 24 is fixedly mounted. At this time, the straight portions 1a and 1e of each wire extending through different slots 21 to the outside of the armature core 20 are connected to the commutator 24, as illustrated somewhat diagrammatically in FIG. 9. Even after the assembly of the integrated coil body with the core 20, the portions 1f and 1h remain in the Archimedes' spiral relationship, a shown in FIG. 8.

As shown in FIGS. 9 and 10, the height h, or extent of axial projection beyond the end of the core, of a coil end portion 23 of the embodiment according to this invention can be found to be:

$$h = 2d + R$$

where d is the diameter of the conductive wire 1 and R is the radius of curvature of the bent portion 1i of that wire 1. According to our experimental results from actually manufacturing an armature, using an integrated armature coil body prepared by the above-mentioned method, the height h of the coil end portion 23 of such armature was 9.5 mm. However, the height h of an armature having an identical core but provided with an integrated armature coil body prepared by one of the conventional methods was 16 mm. The diameter d of the conductive wire 1 used in both experiments was 2.6 mm. It is clear from these experimental results that according to the present invention the coil end portion's height h can be reduced by almost half.

According to this invention, the integrated armature coil body of an armature has curved connecting portions 1f and 1h and they are annularly disposed such that portions 1f and portions 1h of different conductive wires of the integrated armature coil body are overlapped one upon another, thus it is possible to minimize the height h of the coil end portion 23, and manufacture a small and powerful armature with the improved centrifugal force strength. In fact, two different starter motors, identical except one embodied this invention and the other the conventional integrated coil winding, were tested for output in KWS. The starter motor embodying this invention had an output of 2.25 KW, while the output of the other was 2 KW.

It will be noted that the invention is not limited to the embodiment illustrated and described herein, and various changes or modifications within the gist of the invention can easily be made by those skilled in the art. For example, an even number of the straight portions of conductive wires, more than two, may be inserted into one of the slots of the armature core. The height of the coil end portion then can be given by:

$$h \approx nd + R$$

where n is the number of conductive wires inserted into each slot.

We claim:

1. A method for manufacturing an armature for an electric motor, the steps comprising:
   (a) eccentrically bending at about its midlength a straight conductive wire having a predetermined length to form a curved head portion and first and second straight portions, all of said portions being in substantially the same plane with said first and second straight portions diverging slightly from said head portion and the latter projecting to one side of said second straight portion away from said first straight portion;
   (b) inserting said first and second straight portions of a plurality of the bent wires into a corresponding number of opposed longitudinal slots in the interior of an external rotatable cylindrical jig and in the exterior of an internal cylindrical jig coaxially disposed in the external jig so that the planes of the wires are radially disposed while the head portions project radially inward of the slots in the internal jig;
   (c) restraining the radially innermost edges of the head portions against radial inward movement;
   (d) applying pressure axially of and toward the jigs against the head portions of the bent wires;
   (e) relatively rotating the jigs in one direction through a predetermined rotational angle to make an integrated coil body, whereby each of the head portions of the bent wires is transformed into a first curved connecting portion extending radially inward at substantially a right angle from the first straight portion, a second curved connecting portion extending radially inward at substantially a right angle from the second straight portion and a twisted portion having a longitudinal component or direction as respects the straight portions connecting the curved connecting portions, the first curved connecting portion of each wire being offset axially beyond the second curved connecting portion and overlying the second curved connecting portion of a plurality of other wires and the first and second curved connecting portions being disposed, respectively, substantially in the Archimedes' spiral relationship.
   (f) removing the integrated coil body from the jigs and inserting the first and second straight portions of the wires respectively into one end of different ones of a corresponding number of annularly arranged slots extending throughout the axial length of an armature core; and
   (g) connecting the first and second straight portions extending out of the other ends of the slots to a commutator.

2. The method defined by claim 1 including the step following step (b) of relatively rotating the jigs in the opposite direction through a rotational angle smaller than the predetermined rotational angle to increase the diameter of the circle defined by the innermost edges of the head portions and to incline the bent wires to the radial.